United States Patent
Duppong

(10) Patent No.: US 6,357,231 B1
(45) Date of Patent: Mar. 19, 2002

(54) HYDRAULIC PUMP CIRCUIT FOR MINI EXCAVATORS

(75) Inventor: Gerald J. Duppong, Bismarck, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/567,144

(22) Filed: May 9, 2000

(51) Int. Cl.[7] .............................................. F16D 31/02
(52) U.S. Cl. .............................. 60/421; 60/429; 60/430
(58) Field of Search ........................... 60/421, 429, 430, 60/426

(56) References Cited

U.S. PATENT DOCUMENTS

| | | | |
|---|---|---|---|
| 3,578,787 A | 5/1971 | Brickett ........................ 212/59 |
| 3,720,059 A | * 3/1973 | Schurawski et al. ........... 60/421 |
| 4,011,920 A | 3/1977 | Bianchetta et al. ........ 180/6.48 |
| 4,073,141 A | * 2/1978 | Lohbauer ..................... 60/421 |
| 4,078,681 A | * 3/1978 | Field, Jr. ..................... 60/421 |
| 4,199,943 A | 4/1980 | Hunt ........................... 60/430 |
| 4,210,061 A | 7/1980 | Bianchetta ...................... 91/6 |
| 4,365,429 A | 12/1982 | Ecker et al. .................. 37/103 |
| 4,454,715 A | * 6/1984 | Muller et al. ................. 60/421 |
| 4,768,339 A | 9/1988 | Aoyagi et al. ................. 60/427 |
| 4,770,083 A | 9/1988 | Johnson ........................ 91/441 |
| 5,081,837 A | 1/1992 | Ueno ........................... 60/421 |
| 5,083,428 A | 1/1992 | Kubomoto et al. ........... 60/421 |
| 5,127,227 A | 7/1992 | Ikari ............................ 60/421 |
| 5,446,979 A | 9/1995 | Sugiyama et al. ............ 37/348 |
| 5,481,872 A | 1/1996 | Karakama et al. ............ 60/421 |
| 5,488,787 A | 2/1996 | Aoyagi et al. ................. 37/348 |
| 5,832,729 A | 11/1998 | Reid et al. .................... 60/421 |
| 5,852,934 A | 12/1998 | Chung et al. ................. 60/421 |
| 6,018,895 A | 2/2000 | Duppong et al. ............. 37/348 |

* cited by examiner

Primary Examiner—Edward K. Look
Assistant Examiner—Igor Kershteyn
(74) Attorney, Agent, or Firm—Westman, Champlin & Kelly, P.A.

(57) ABSTRACT

An off road machine is provided with a hydraulic system for operating drive motors for propelling the machine, as well as operating actuators for machine functions. The hydraulic system utilizes three pumps, with the pumps connected to a single high pressure relief valve. Additionally, two of the pumps normally are used for driving traction motors for the machine, and when a valve is operated the third pump flow is provided to both of the drive motors for the vehicle to increase the speed of machine movement. Additionally, a dump valve is used for insuring that the flow from the pump will be diverted to tank unless an operator ready signal is present.

12 Claims, 3 Drawing Sheets

HYDRAULIC PUMP CIRCUIT FOR MINI EXCAVATORS

BACKGROUND OF THE INVENTION

The present invention relates to a hydraulic pump circuit for excavators, in particular, as well as other machines that have hydraulic systems for operating components and for ground drive. The hydraulic circuit includes three pumps, one of which is normally used for hydraulic power for auxiliary attachments, and which can be coupled to the drive circuit for propulsion, to provide an increase in speed of travel of the machine at desired times. Additionally, the hydraulic circuit has all three pumps plumbed into a single relief valve to simplify the overall operation.

U.S. Pat. No. 6,018,895 shows a valve stack for a mini-excavator that has multiple hydraulic pumps, to provide flow for various purposes. In patent '895, the valve block provides a series connection between certain of the operating cylinders and the vehicle drive. The machine illustrated in patent '895 is the type of machine with which the present hydraulic circuit operates.

Various types of operations are carried out with the hydraulic system of an excavator, including powering the drive motors for driving tracks. Excavators have a boom and arm that are operated with a hydraulic cylinders to pivot the boom and arm. The boom is capable of being swung about a generally vertical axis. The arm is pivoted to the boom and a bucket is mounted on the arm. Both the arm and bucket are operated with hydraulic cylinders. A blade can be used, and raised and lowered by actuating a hydraulic cylinder. The blade can be considered as an auxiliary component, and in addition there can be auxiliary machines such as mowers or the like that might be held at the outer end of the arm and driven with a hydraulic motor.

The cab of an excavator is generally capable of rotating about an upright axis through the operation of a hydraulic motor as well. Thus, it can be seen that the modern excavator requires substantial hydraulic power, and efficient use of this power can be made with appropriate hydraulic circuits.

SUMMARY OF THE INVENTION

The present invention relates to efficiently operating a multiple hydraulic pump system that is used for powering various hydraulic actuators, and also for providing a drive power for motors used to propel the machine on which the hydraulic system is used. There are a plurality of motors, as disclosed three, and efficient use of the output of these motors is desired in order to obtain high operating efficiency of the machine.

The present invention includes a unique valve block for controlling the flows from three pumps, including a single relief valve for providing the high pressure relief for all three of the motors. Additionally, while two of the pumps are generally used for operating the excavating boom, the arm, boom swing, and buckets, and since these components are not normally operated during travel, the right and left hand travel or drive motors are also normally powered by first and second pumps, respectively.

The third pump is used for controlling the "slew" motor for or cab and mounting frame rotation for the blade that is normally used for backfilling, and also for auxiliary hydraulic components.

The operations of the various actuators for boom swing, arm, bucket, and boom pivot are conventional, as is the operation of the slew motor, the blade and the auxiliary devices. The controls are standard valves, and can be operated with conventional joy sticks or similar controls. The motors for driving the ground drive tracks of the excavator are normally operated with levers that are moved back and forth by hand to drive the respective side motors either in forward or reverse.

In addition to having a single relief valve coupled to provide high pressure relief for all three pumps, to thereby eliminate the need for individual relief valves, one of the pumps, which is normally used for auxiliary operations and also for the slew motor and blade, is made to so that it will provide pressure to these functions, including auxiliary devices, even when the travel motors are working and the excavator is moving. However, by operation of a valve at a selected time, the operator can add the volume of flow of the third pump into the circuit for driving the track drive motors and thereby increasing the speed of the machine as it moves over the ground.

The pump that provides the output that can be added to the drive motors also is arranged in the system so that it can be used for running auxiliary operations at the same time the ground drive motors for the excavator are being operated by the other pumps. In other words, the third pump acts independently to power auxiliary equipment and does not require the vehicle to be standing still. This is helpful if operations such as mowing along a strip is to be performed while the excavator is moving from one job to another. There is no need to stop and swing the arm to mow the ground.

The valve block for the motor outputs thus provides various functions that simplifies the component arrangement, while enhancing operation and reducing costs.

DETAILED DESCRIPTION OF THE ILLUSTRATIVE EMBODIMENTS

Figure 1:
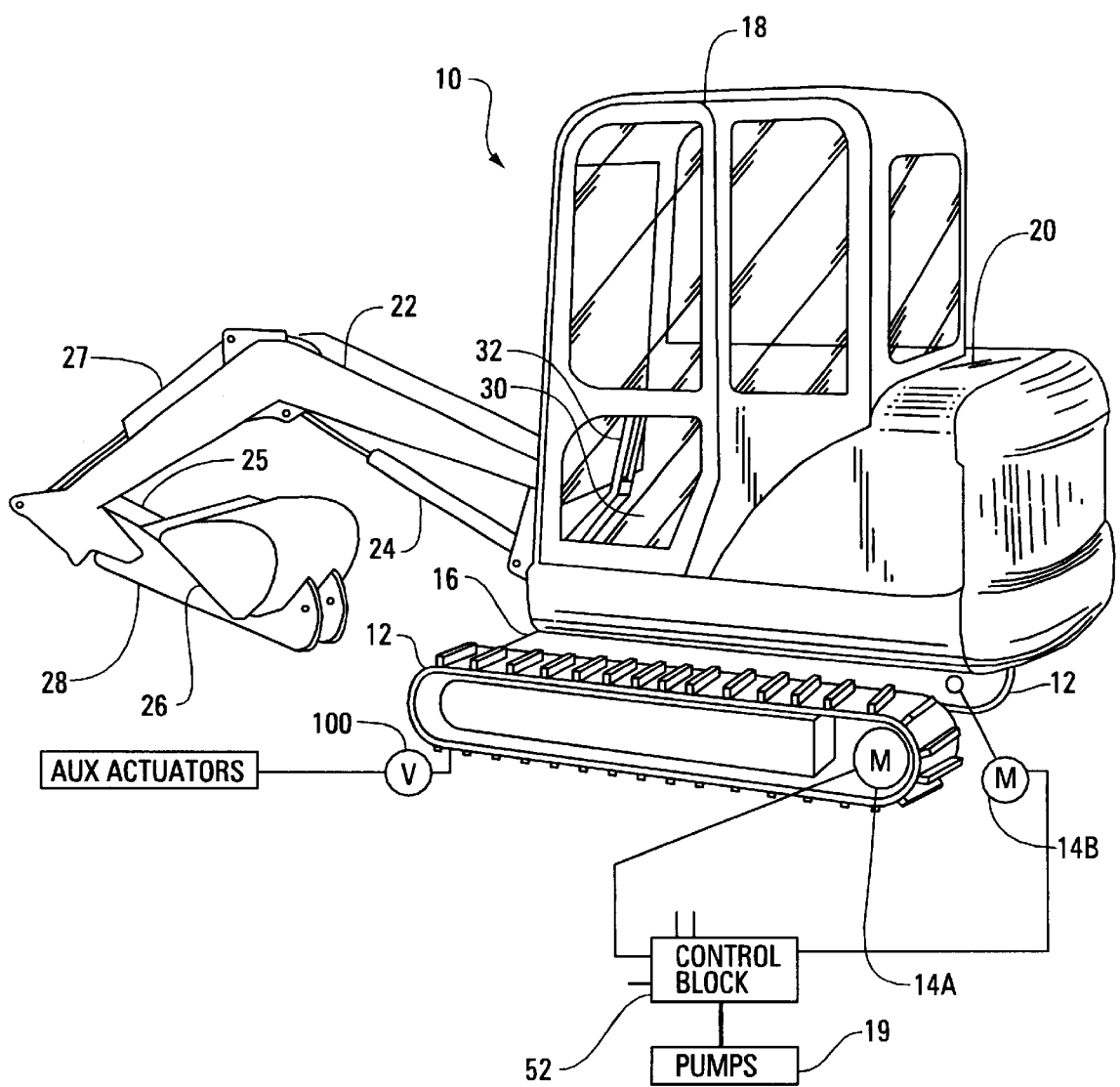
FIG. 1 is a schematic representation of an excavator on which the hydraulic circuit of the present invention is used.

A mini-excavator (an off road vehicle) on which the hydraulic circuit of the present invention is used is illustrated generally at 10. The excavator has drive tracks 12 that are on opposite sides of a frame 16, and which are used for moving the excavator across the ground. These are propulsion devices, for self-propelling the machine between locations. The tracks 12 are driven by separate hydraulic motors indicated at 14A and 14B, for the two sides of the frame 16. By driving both tracks simultaneously in the same direction the excavator 10 can be moved forward or backward, and by driving one track or the other, or by driving the tracks in opposite directions, the excavator frame can be turned in a normal manner. The drive also can be for a loader or other off road vehicle.

The excavator 10 includes an operator's cab 18 that has an engine compartment 20 in which an engine is mounted. The engine is used for driving hydraulic pumps illustrated generally at 19, that are in a pump block, and operate through a control block 52 to control the motors 14A and 14B, as well as other actuators and the like, as will be described.

The excavator 10 has a boom 22 that is mounted on a swing frame about a horizontal pivot in a normal manner, and the boom can be operated about this pivot with an actuator 24. The swing frame can be pivoted about an upright axis. There is a dipper arm 25 at an outer end of the boom 22, operated with an actuator 27 for pivoting about a horizontal axis. A bucket 26 is pivoted to the arm and can be operated with an actuator 28. This arrangement is conventional in excavators.

The actuators or hydraulic cylinders 24, 27, and 28, as well as the hydraulic motors and other components are operated from controls inside the cab 10. Joystick controls are used, or if desired levers for operating the motors can be provided. However, in any event manual operation of selected levers will cause valves to operate to drive the actuators in the appropriate direction, and also to rotate the drive motors in the appropriate direction.

Figure 2:
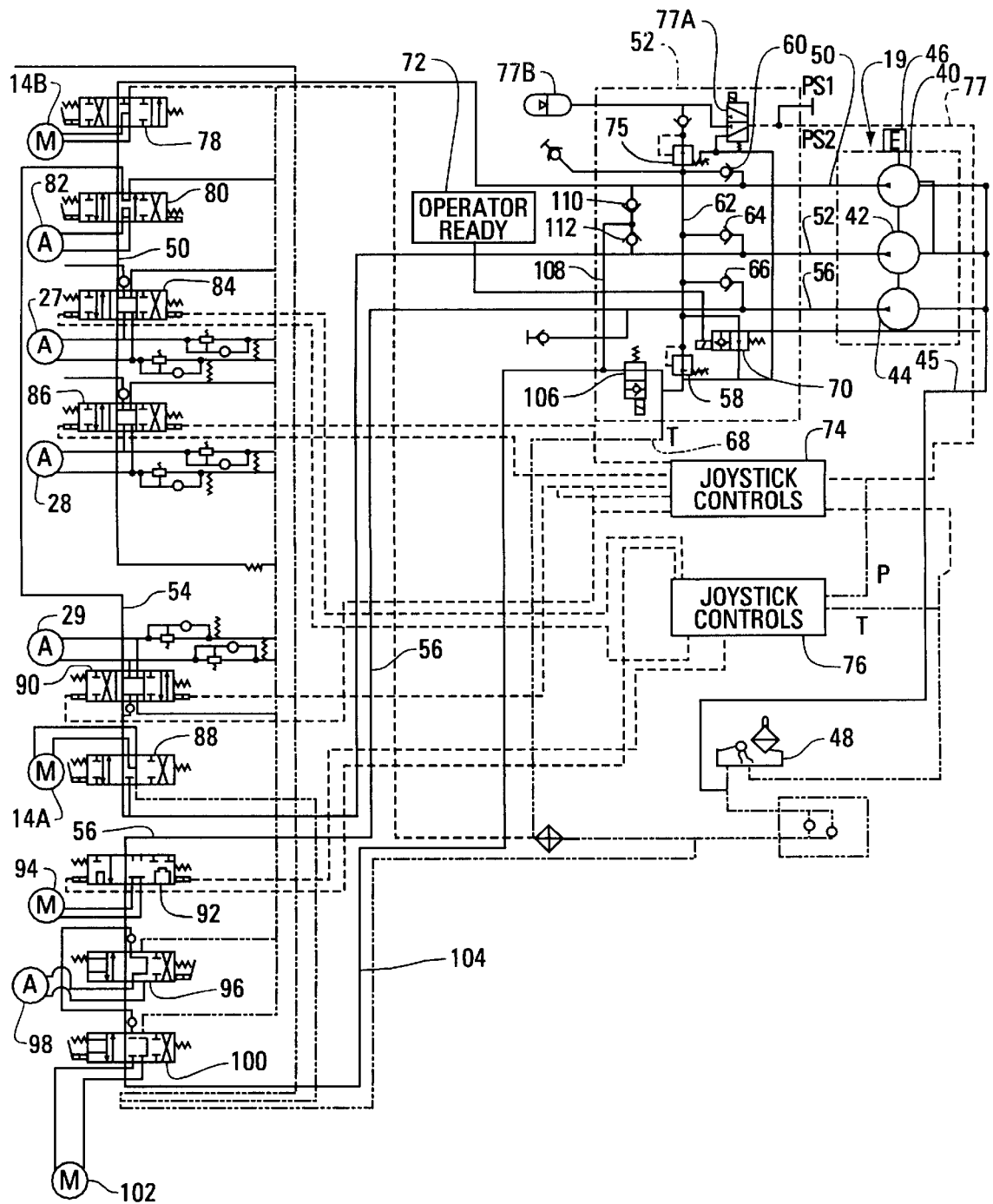
FIG. 2 is a schematic representation of the hydraulic circuit of the present invention.

The cab can be rotated about an upright axis relative to the frame 16, using a slew motor, and the boom 22 can be pivoted about an upright axis for boom swing, as well, even though that actuator is not shown in FIG. 1, it is shown schematically in FIG. 2.

The hydraulic circuit of the present invention is shown schematically in FIG. 2. It is a simplified schematic without all of the lines shown. The valves used for operation of the various actuators are conventional, and are disclosed in U.S. Pat. No. 6,018,895.

In FIG. 2, a pump block 19 is shown, and is outlined in dashed lines. The pump block includes a first pump 40, a second pump 42, and a third pump 44 all in one pump block. The pumps are driven from the engine which is represented as a block 46.

The pumps have intake lines represented at 45 connected to a reservoir 48, and have output lines carrying hydraulic fluid under pressure. Pump 40 is connected with an output line 50 to a valve block 52. Pump 42 is connected with an output line 54 to the valve block 52, and pump 44 is connected with an output line 56 to the valve block 52. The valve block 52 includes a single main relief valve 58 that is set at approximately 2500 psi gage. It can be seen that the output line 50 is connected through a check valve 60 to the relief valve 58 along a line 62. The output line 54 for pump 42 is connected through a check valve 64 to the line 62 and thus to relief valve 58, and the output line 56 from pump 44 is connected through a check valve 66 to the line 62 and thus to the relief valve. When the relief valve 58 opens, it connects to a drain or return line 68 leading to the tank 48.

One of the improvements of the present invention is that the single relief valve 58 is operative for all three of the pumps 40, 42 and 44. Only one relief valve is necessary, as opposed to separate relief valves for each pump.

The relief line 62 that carries pressure and flow from all three pumps is connected through a normally open solenoid valve 70 that leads from line 52 to a drain or tank line 68. Valve 70 is actuated by suitable sensors or switches sensitive to the working or down position of an operator's console (represented at 71) in the cab 18. When the console 71 is not in its working or operating position, the valve 70 will remain open and not permit operation of any of the components because the outputs of the three pumps 40, 42 and 44 will be dumped to the drain line 68 and no pressure can be generated in the circuits. However, when the operator presence is sensed or a sensor indicates the console has been lowered and is in working position, after lowering the console, the working position, and as represented by the blocks 72 and 72A (FIG. 3), the valve 70 is energized through its solenoid connection, and it will move to provide a check valve position where a check valve 70A in the valve blocks any flow from the line 62 through the valve 70. Then, the pumps 40, 42 and 44 are ready for operation.

Joystick controls 74 and 76 are shown schematically in FIG. 2, and are conventional joystick controls that have multiple positions and which generally are pilot valve operators that will provide pilot pressure to main actuator valves for operation. The joystick controls are conventional purchased valve units that include internal channels and the like so that movement of the joysticks in a particular direction will cause operation of control valves in a conventional manner. The pilot pressure is provided from a pressure reducing valve 75 that provides a constant pressure along a line 77 to the joystick 74 and 76 for valve operation. A valve 77A can be used to connect line 77 to valve 75 or to an accumulator 77B. The designate PS1 is for a pressure tap. The line 50 can remain at high pressure with valve 75 regulating the pilot pressure to 365 psi.

The joystick controls are used for controlling the boom, arm, slew and other functions. The travel motor control valves that control operation of the motors 14A and 14B are individually controlled, generally through hand levers such as those shown at 32 in FIG. 1, that can be moved back and forth to control the valves to the motors.

For example, the output of pump 40 is provided along line 50 to a right hand travel valve 78 that controls the motor 14B for driving the right hand track 12. When the valve 78 is not open to operate motor 14B, flow from pump 40 is provided through valve 78 to the boom swing control valve 80, which will operate an actuator 82 for swinging the boom from side to side. The boom swing valve 80 is separately operated as well, by a separate operator control. The line 50 from pump 40 also provides hydraulic fluid under pressure to the arm valve 84 that is controlled by one of the joysticks, such as the joystick 76. Valve 84 controls operation of the arm actuator 27. The bucket control valve 86 also will receive the pump 40 output flow and is operated for example by the joystick control 74. Valve 86 controls operation of the actuator 28.

Thus, the pump 40 will provide hydraulic fluid under pressure for these various functions, and because the valve 78 is in series with the parallel connected valves 80, 84 and 86, the operation of the valve 78 for travel will provide all of the flow from pump 40 to the motor 14B.

The output of the pump 42 is connected with the line 54 to the left hand travel valve shown at 88, which controls the track drive motor 14A to control the left hand drive track. The valve 88 is controlled independently by one of the hand levers shown at 32 in FIG. 1. The line 54 then passes through the left hand travel valve 88 to the boom control valve 90 which is used for controlling the boom actuator 24. Valve 90 for the boom can be controlled by joystick 74. The flow from pump 42 on line 54 also is provided in parallel with the pump 40 output to the boom swing, arm, and bucket actuators.

The pump 44 output along line 56 is provided to the slew or cab rotation drive motor 94 through a valve 92. Motor 94 will drive the cab about an upright axis when the valve 92 is operated. This is also controlled by a joystick control such as the joystick 76.

The flow through the line 56 also is provided in series to a dozer blade cylinder or actuator 98 for operating an auxiliary blade, through a valve 96. Actuator 98 will raise and lower a dozer blade (not shown) that can be used for backfilling or moving dirt.

An auxiliary valve 100 is connected to line 56 in parallel with valve 96 and in series with valves 92. Valve 100 is used for driving an auxiliary motor or actuator 102. As was mentioned, motor 102 may be a drive for a rotary mower, which could be mounted on the end of the excavator arm in place of the bucket and used for mowing as the excavator moves along the ground.

The flow from line 56 then passes into a flow return line 104 that connects to a solenoid controlled valve 106 in the valve block 52. The solenoid controlled valve 106 normally is in a position to provide a direct connection from line 104 to the drain or tank line 68, so that the flow from pump 44 circulates into the tank when the valves 92, 96 or 100 are not being used.

When, for example, the motors 14A and 14B are operated and the excavator is moving along the ground, and it is desired to increase the travel speed, the valve 106 can be shifted by operating a manual control 107 (FIG. 3) so that the return line 104 is blocked from connection to the drain line 68, and flow from pump 44 then is forced up through a line 108 to a junction between check valves 110 and 112. Check valves 110 and 112 connect to the lines 50 and 54, respectively and are set to block flow from lines 50 and 54, but will permit flow from line 108 to lines 50 and 54 when the pressure in line 108 is greater than in lines 50 and 54. Thus with the solenoid valve 106 in its check valve position blocking flow of the hydraulic fluid under pressure carried in line 104 back to tank, the flow from line 104 and thus from the pump 44 is forced into the lines leading to the valves 78 and 88 since the full operating pressure is available in line 108. The motors 14A and 14B are therefore provided with an increased flow. This will increase the speed of travel of the excavator.

The pumps 40 and 42 will preferably have equal output flow, while the pump 44 can have a flow that is equal to both of the pumps 40 and 42. In other words, if a five gallon per minute pump is used for pumps 40 and 42, a ten gallon a minute pump is used for pump 44.

It can also be seen that having a separate circuit from pump 44 to the auxiliary valve 100 will permit the auxiliary motor (which may be a linear motor or actuator) 102 to be operated even when the left hand travel and right hand travel valves 77 and 78 are providing hydraulic fluid to the motors 14A and 14B. This will permit the operation of auxiliary equipment while the excavator is travelling over the ground.

The single valve block 52 includes the single relief valve 58 and the dump valve 70 that is tied in with the operator presence or control console signal 72, and provides an auxiliary drive valve 106 that will increase the speed to provide a two-speed output for driving the excavator.

It also can be noted that if the auxiliary valve 100 is operating, or the blade valve 96 or the slew valve 92 are open to drive actuators, the additional ground travel speed boost or second speed cannot be obtained because the hydraulic fluid from the pump 44 would be blocked from the line 104, and it would be returned to tank through the drain connections to the respective valves.

It also should be noted that the auxiliary valve 100 is manually or separately operated by the operator, and is not tied into the joystick controls. Likewise, the blade valve 96 is separately operated. The slew valve, boom valve, bucket valve, and arm valves can be joystick controlled.

The valve block 52 provides connection and internal valves that increase the efficiency of operation of multiple pumps. The benefits of two speed operation are obtained without compromising the other functions of the circuit.

Figure 3:
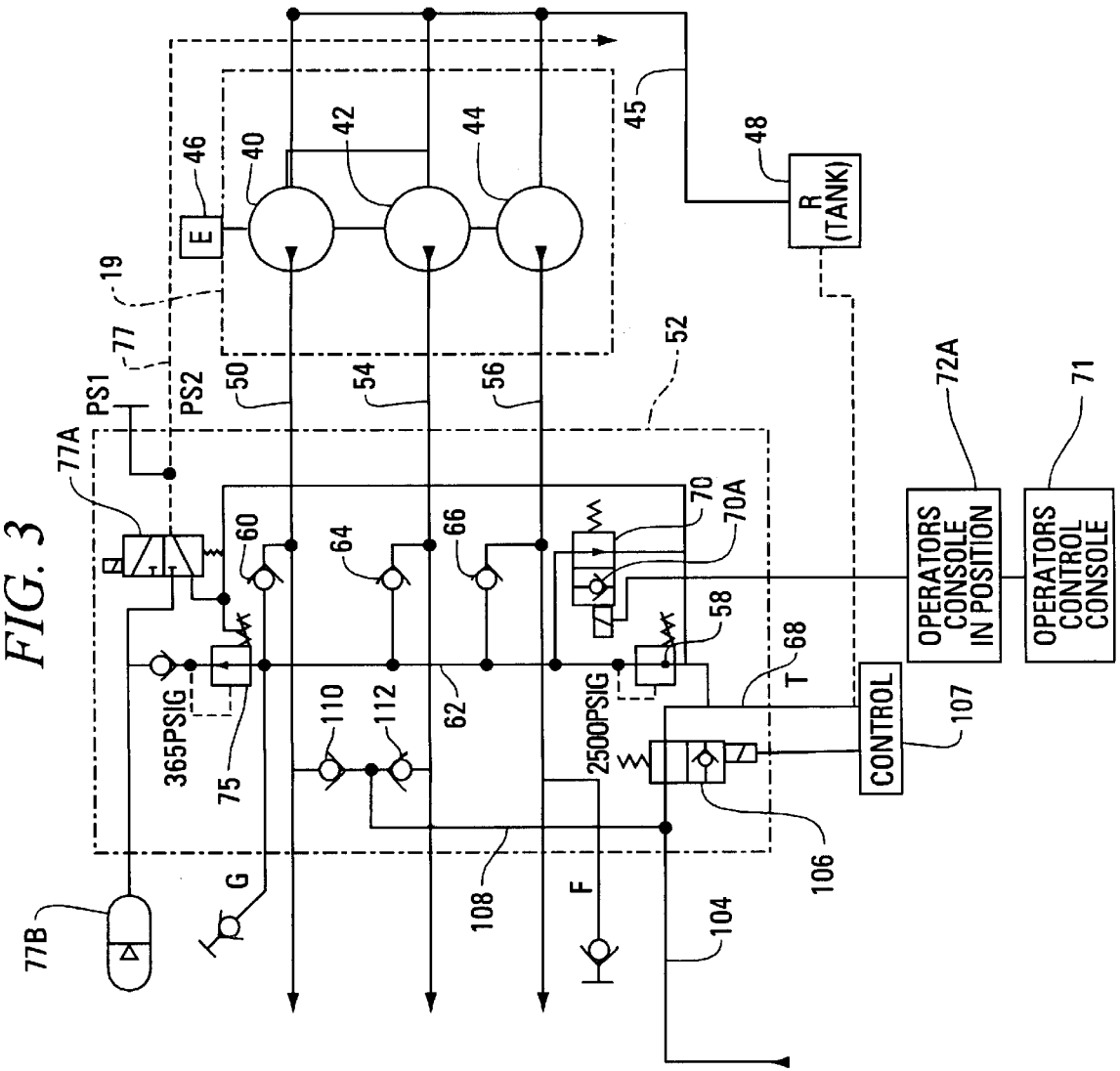
FIG. 3 is an enlarged schematic view of the pumps and the pump control valve block used according to the present invention.

In FIG. 3, the line "G" is a pressure gage tap that permits checking the pressures in line 62, which gives the operating pressure of all of the pump. The port "IF" is a fill port used at the factory.

Although the present invention has been described with reference to preferred embodiments, workers skilled in the art will recognize that changes may be made in form and detail without departing from the spirit and scope of the invention.

What is claimed is:

1. A hydraulic circuit for driving motors for propelling a machine across the ground comprising first, second and third pumps providing fluid under pressure along first, second and third output lines, respectively, the first and second pumps being connected to drive separate vehicle propulsion motors, the third pump providing a flow of fluid to control valves for work elements on the machine, and through a normally open valve to drain, a pair of check valves connected to and preventing from the first output line of said first pump to the third pump and from the second output line of the second pump to the third pump, a coupling line from the normally open valve connected between the check valves, the normally open valve being moveable to block fluid flow from the third pump to drain and force fluid under pressure into the coupling line, said check valves opening to permit flow of fluid from the third pump through the check valves when the normally open valve moves to block fluid flow from the third pump to drain.

2. The hydraulic circuit of claim 1 and a check valve preventing flow of fluid from the first pump to the line connecting the normally open valve to the first pump.

3. The hydraulic circuit of claim 1, wherein said pumps are each connected through output check valves to the input side of a single pressure relief valve, the output check valves preventing flow of fluid from the input of the pressure relief valve to the respective pump.

4. The hydraulic circuit of claim 3, including a dump valve for normally permitting flow from the line connected to the input of the relief valve to tank, and said dump valve preventing such flow when a signal indicates an operator is in position to operate the machine.

5. The hydraulic circuit of claim 4, wherein said relief valve, said dump valve, and said normally open valve all are mounted in a common block with said check valves.

6. A hydraulic control system for a off-road vehicle having propulsion drives on first and second sides of a frame, and separate hydraulic propulsion motors to drive the propulsion drives:

a plurality of three pumps for providing hydraulic fluid under pressure along separate first, second and third output lines;

a first valve connected to the first output line for controlling flow from a first pump to a first propulsion motor for the drive on the first side of said off-road vehicle;

a second valve connected to the second output line for controlling flow of fluid from a second pump to a second propulsion motor for the drive on the second side of the off-road vehicle;

a third valve for controlling hydraulic motors connected to the third output line of a third pump, said third pump being capable of providing fluid under pressure to said third valve regardless of positions of the first and second valves; and a dump valve that is normally open for connecting flow from the outputs of all three pumps to a hydraulic fluid reservoir, a sensor for providing a signal to said dump valve indicating an operator is ready, said dump valve moving to block flow through the dump valve when the signal is provided.

7. The hydraulic system of claim 6, and a single relief valve, said pumps connected to an input of said single relief valve through check valves that prevent reverse flow from the input of the single relief valve to the pumps.

8. A hydraulic control system for a off-road vehicle having propulsion drives on first and second sides of a frame, and a hydraulic auxiliary motor for performing work operations comprising a plurality of three pumps for providing hydraulic fluid under pressure along separate first, second and third output lines; a first valve connected to the first output line for controlling flow from a first pump to a first propulsion motor for the drive on the first side of said off-road vehicle; a second valve connected to the second output line for controlling flow of fluid from a second pump to a second propulsion motor for the drive on the second side of the off-road vehicle; a third valve for controlling hydraulic motors connected to the third output line of a third pump, said third pump being capable of providing fluid under pressure to said third valve regardless of positions of the first and second valves; and a control valve in series with said third valve, and connected between the third valve and a hydraulic fluid reservoir, said control valve normally providing flow passing through the third valve to the reservoir, said control valve being closable to block flow to said reservoir, and a line connecting the output of the third pump to the first and second output lines of said first and second pumps through check valves to add fluid flow from the third pump for driving both of the first and second propulsion motors when the control valve blocks flow to the reservoir.

9. The hydraulic system of claim 8 wherein the first, second and third valves and the control valve are mounted in a single valve block.

10. The hydraulic system of claim 9, and a single relief valve mounted in the single valve block and connected to provide pressure relief for the first, second and third pumps.

11. The hydraulic system of claim 10 and a dump valve in the single valve block connected to dump flow from the first, second and third pump until occurrence of a preselected occurrence.

12. The hydraulic system of claim 11 and a sensor to sense a working position of a control console for the off road vehicle, and wherein the preselected occurrence is movement of the control console to a working position.

* * * * *

UNITED STATES PATENT AND TRADEMARK OFFICE
CERTIFICATE OF CORRECTION

PATENT NO.     : 6,357,231 B1
DATED          : March 19, 2002
INVENTOR(S)    : Gerald J. Duppong It is certified that error appears in the above-identified patent and that said Letters Patent is hereby corrected as shown below:

Column 6,
Line 15, after the word "preventing" insert -- flow --.
Line 41, cancel "a" (second occurrence) and insert -- an --.

Column 7,
Line 3, cancel "a" (second occurrence) and insert -- an --.

Signed and Sealed this

Fifth Day of November, 2002

Attest:

Attesting Officer

JAMES E. ROGAN
*Director of the United States Patent and Trademark Office*